(12) United States Patent
Sarangapani

(10) Patent No.: US 6,173,215 B1
(45) Date of Patent: *Jan. 9, 2001

(54) METHOD FOR DETERMINING A DESIRED RESPONSE TO DETECTION OF AN OBSTACLE

(75) Inventor: Jagannathan Sarangapani, Peoria, IL (US)

(73) Assignee: Caterpillar Inc., Peoria, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/994,732

(22) Filed: Dec. 19, 1997

(51) Int. Cl.⁷ .................................................. G05B 19/04
(52) U.S. Cl. ........................... 700/255; 700/250; 701/301
(58) Field of Search .................................. 700/255, 250; 701/301, 300; 702/97

(56) References Cited

U.S. PATENT DOCUMENTS

| | | | |
|---|---|---|---|
| 4,644,237 | * 2/1987 | Frushour et al. | 318/640 |
| 4,931,937 | * 6/1990 | Kakinami et al. | 701/300 |
| 5,150,026 | * 9/1992 | Seraji et al. | 318/568.11 |
| 5,278,764 | * 1/1994 | Iizuka et al. | 701/301 |
| 5,291,207 | 3/1994 | Kikuchi et al. | 342/70 |
| 5,357,438 | * 10/1994 | Davidian | 701/301 |
| 5,430,450 | 7/1995 | Holmes | 342/69 |
| 5,436,835 | * 7/1995 | Emry | 701/70 |
| 5,488,277 | * 1/1996 | Nishikawa et al. | 318/587 |
| 5,499,199 | * 3/1996 | Demas et al. | 702/158 |
| 5,521,633 | 5/1996 | Nakajima et al. | 348/118 |
| 5,563,602 | 10/1996 | Stove | 342/70 |
| 5,574,426 | * 11/1996 | Shisgal et al. | 340/435 |
| 5,587,929 | 12/1996 | League et al. | 342/159 |
| 5,594,414 | 1/1997 | Namngani | 340/436 |
| 5,612,883 | 3/1997 | Shaffer et al. | 701/300 |
| 5,613,039 | 3/1997 | Wang et al. | 706/24 |
| 5,631,639 | * 5/1997 | Hibino et al. | 340/903 |
| 5,638,281 | 6/1997 | Wang | 701/301 |
| 5,644,508 | 7/1997 | McNary et al. | 342/159 |
| 5,652,489 | * 7/1997 | Kawakami | 318/587 |
| 5,659,779 | * 8/1997 | Laird et al. | 709/226 |
| 5,663,879 | * 9/1997 | Trovato et al. | 701/2 |
| 5,668,776 | 9/1997 | Katakura | 367/89 |
| 5,680,313 | 10/1997 | Whittaker et al. | 701/300 |

* cited by examiner

*Primary Examiner*—William Grant
*Assistant Examiner*—Paul Rodriguez
(74) *Attorney, Agent, or Firm*—Steve D. Lundquist

(57) ABSTRACT

A method is disclosed for responding to the detection of an obstacle in the path of a mobile machine as the mobile machine traverses the path at a work site. The method includes the steps of scanning a field of interest, detecting the presence of an obstacle, and determining a set of parameters as a function of the mobile machine, the obstacle, and the work site. The method also includes the steps of determining a level of predictability of motion of the obstacle, defining ranges of a plurality of zones as a function of the level of predictability and the parameters, and initiating an action in response to the obstacle being in one of the zones.

21 Claims, 5 Drawing Sheets

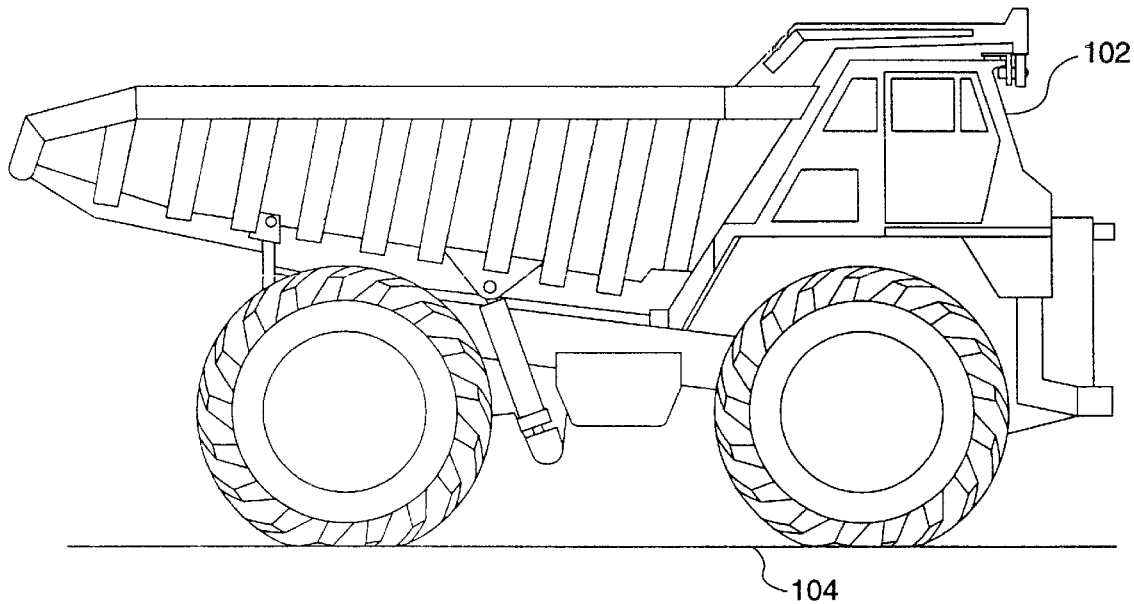
Fig_1_

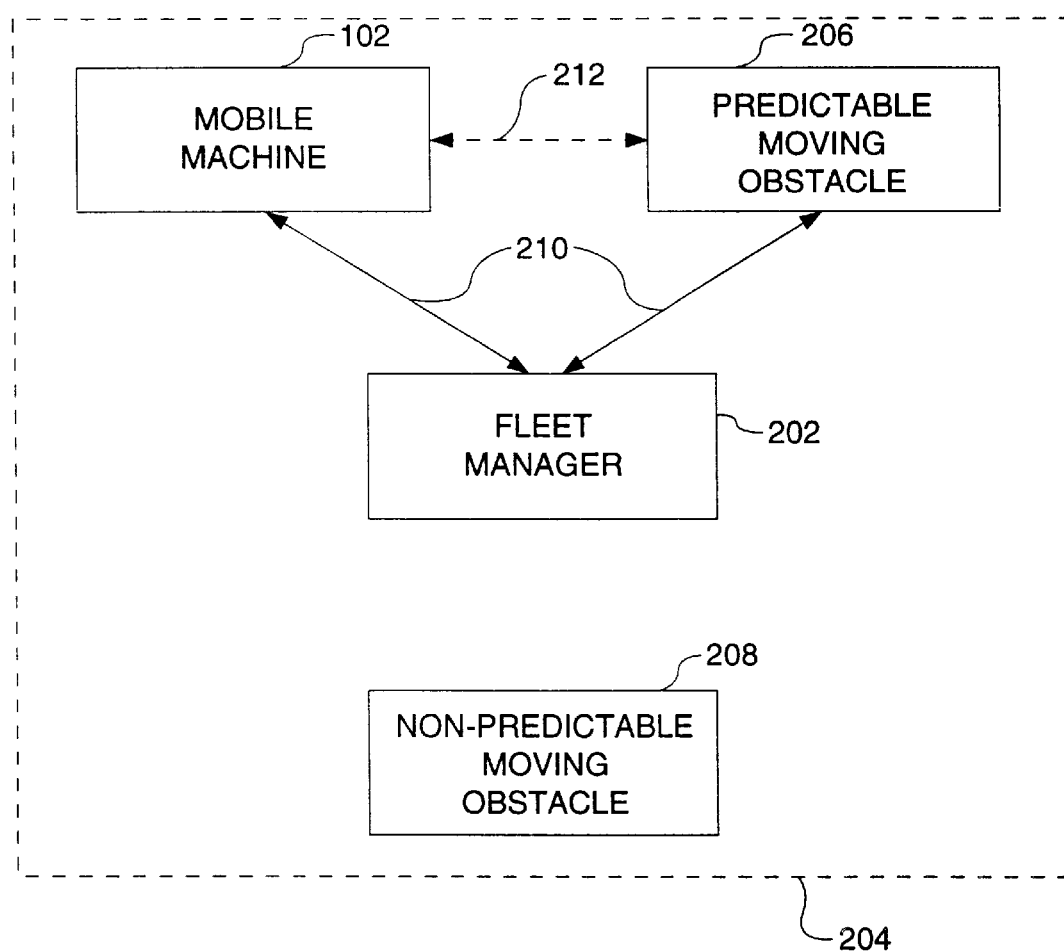
Fig_2_

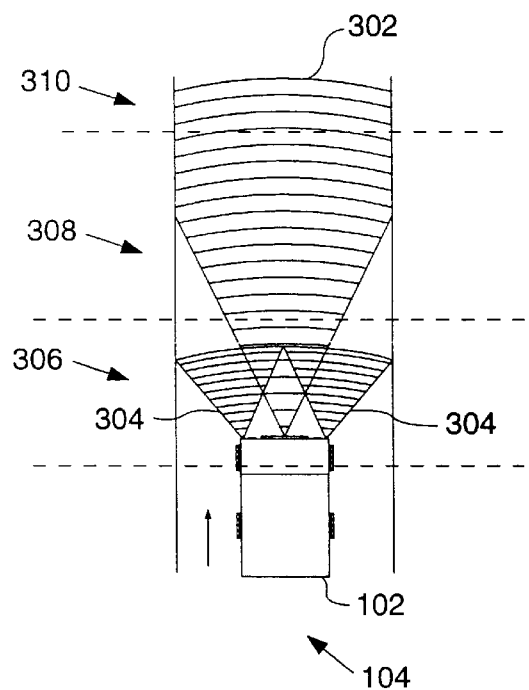
Fig_3_
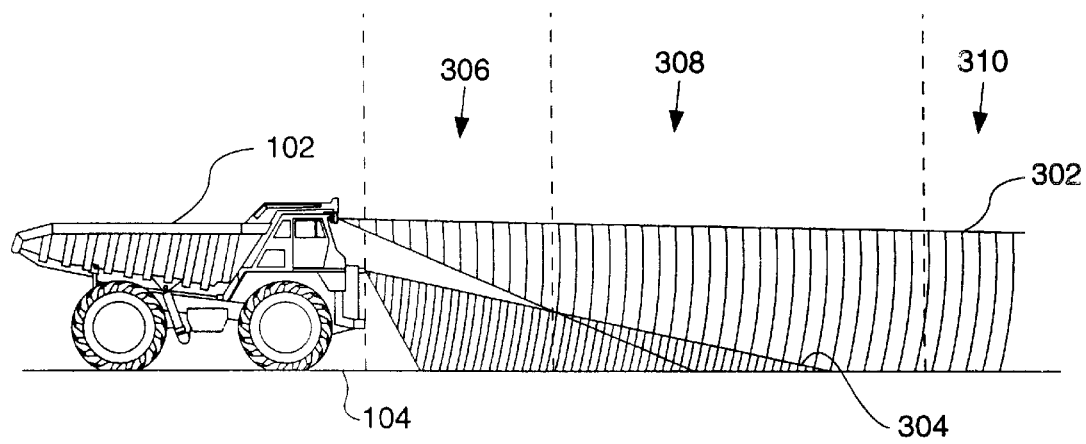
Fig_4_

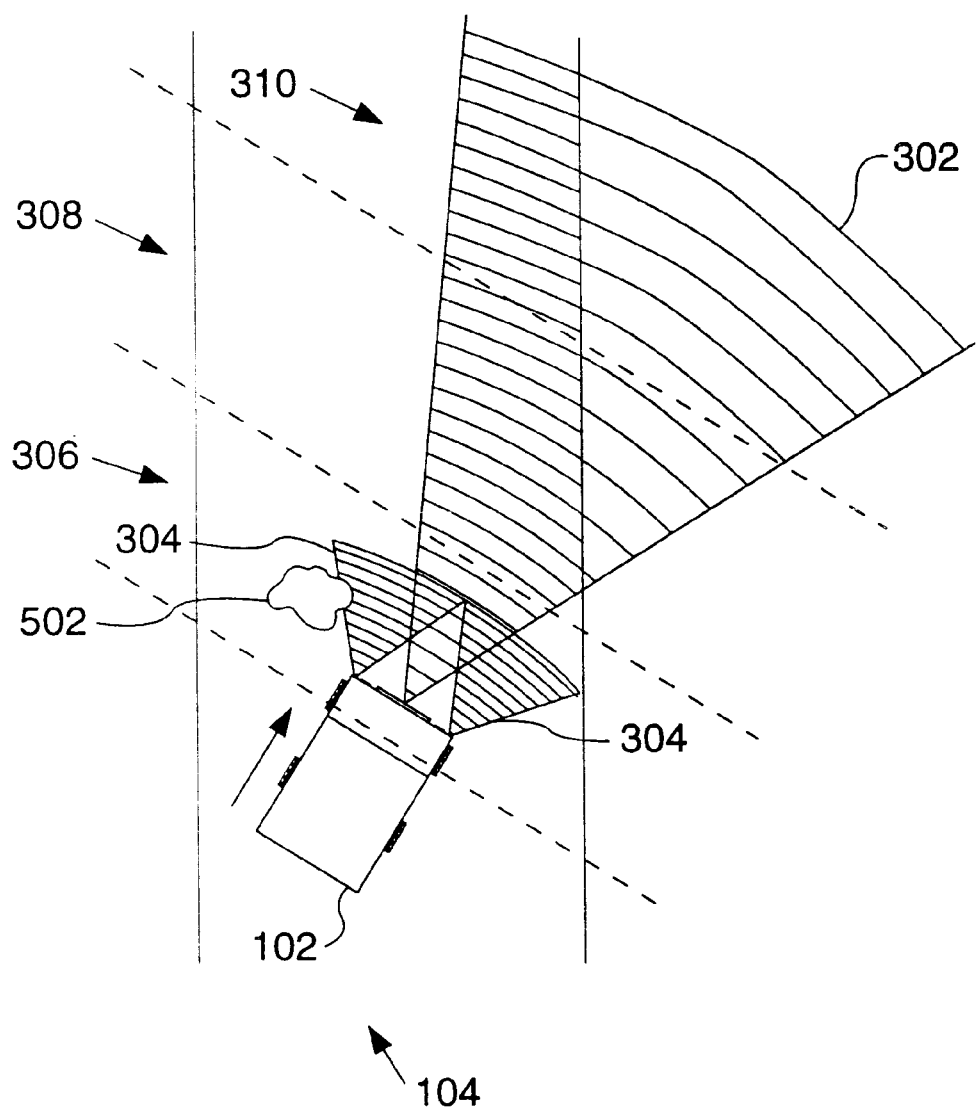

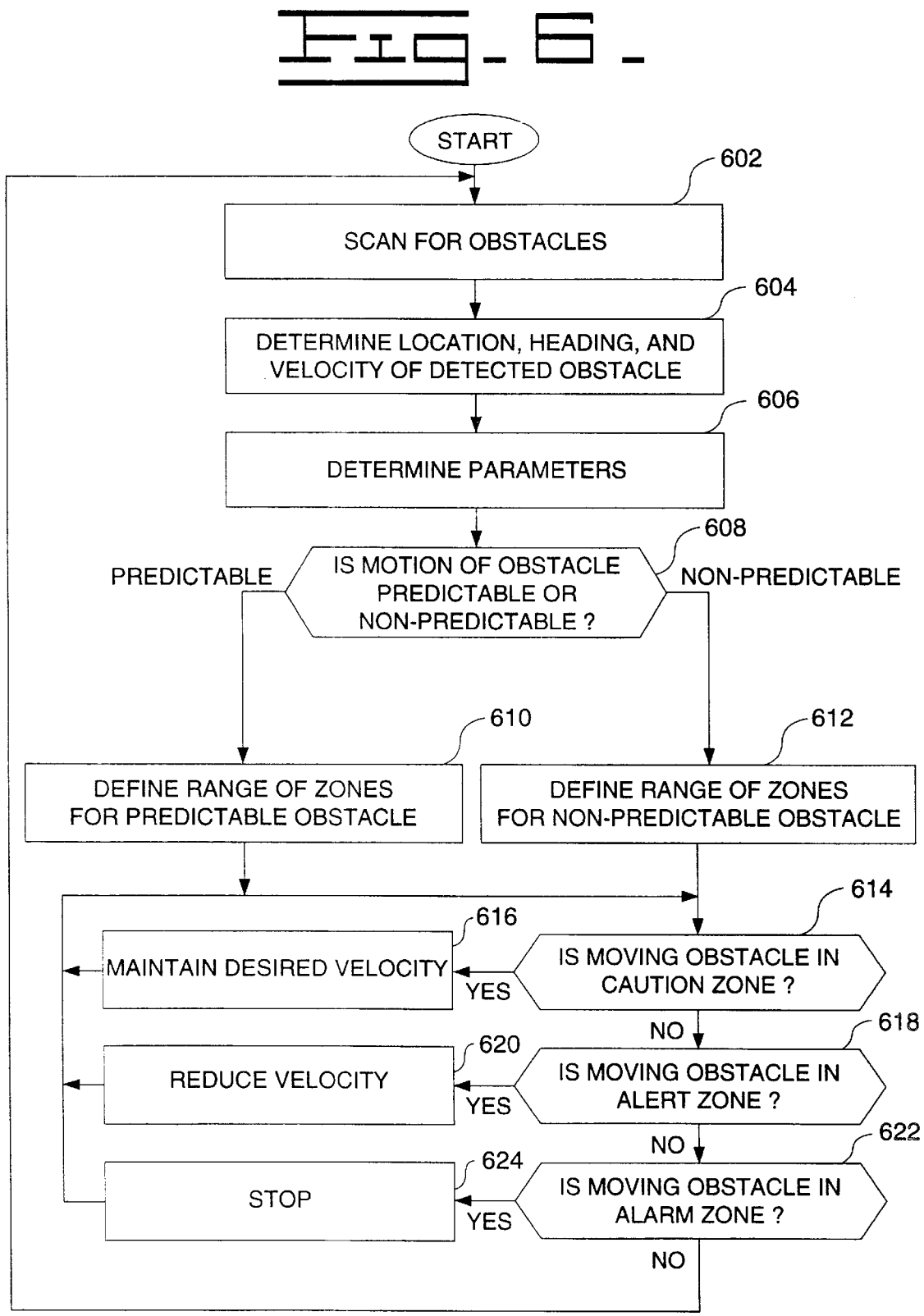

METHOD FOR DETERMINING A DESIRED RESPONSE TO DETECTION OF AN OBSTACLE

TECHNICAL FIELD

This invention relates generally to a method for responding to the detection of an obstacle in the path of a mobile machine and, more particularly, to a method for determining a desired response to detection of an obstacle as a function of zones of distance between the obstacle and the mobile machine.

BACKGROUND ART

Mobile machines are used to perform a variety of tasks. As an example, in an earthworking environment such as a mining site, mobile machines, e.g., off-road mining trucks, haul material throughout the site.

For repetitive tasks such as above, it is becoming advantageous and desirable to operate the mobile machines autonomously. The environment in which the trucks operate may be harsh, and more efficient operations may be attained if the human fatigue factor is eliminated.

As an example of using off-road mining trucks autonomously, U.S. Pat. No. 5,612,883, issued to Shaffer et al., provides an exemplary disclosure of a system for autonomous operations of mobile machines. In this patent, Shaffer et al. disclose a fleet of off-road mining trucks operating autonomously at a mining site. Parameters such as position determination, navigation, path planning, and machine control are performed without the aid of human operators.

An important factor in enabling a mobile machine to operate autonomously is the ability to detect obstacles in the machine's path of travel, and to respond in an acceptable manner when obstacles are detected. The normal course of action when encountering an obstacle is to stop the mobile machine and notify a fleet manager to remove the obstacle. However, this is not always the most efficient course of action. Under some circumstances, stopping the mobile machine may not be necessary, particularly when the obstacle is moving and may soon be out of the path of the mobile machine.

An appropriate response to the detection of an obstacle may vary dependent on the location of the obstacle relative to a mobile machine. A more efficient method for responding to a detected obstacle would be to vary the response as a function of the detected obstacle being in one of a plurality of zones relative to the location of the mobile machine. As an example of using zones of detection, in U.S. Pat. No. 5,521,633, Nakajima et al. disclose the use of a series of zones in the scan pattern of an obstacle detector, each of the zones having a corresponding "rate of danger" of an obstacle detected in the zone. A method for alerting an operator to the presence of an obstacle varies in response to a determination of which zone the obstacle is in.

However, the disclosure of Nakijima et al. does not account for the detected obstacle moving from one zone to another, or to predicting the movement of the obstacle between zones. Responding appropriately and efficiently to the detection of an obstacle, more particularly a moving obstacle, would improve greatly if the movements of the detected obstacle were predictable and could be responded to prior to the obstacle entering a zone.

The present invention is directed to overcoming one or more of the problems as set forth above.

DISCLOSURE OF THE INVENTION

In one aspect of the present invention a method is disclosed for responding to the detection of an obstacle in the path of a mobile machine as the mobile machine traverses the path at a work site. The method includes the steps of scanning a field of interest, detecting the presence of an obstacle, and determining a set of parameters as a function of the mobile machine, the obstacle, and the work site. The method also includes the steps of determining a level of predictability of motion of the obstacle, defining ranges of a plurality of zones as a function of the level of predictability and the parameters, and initiating an action in response to the obstacle being in one of the zones.

BRIEF DESCRIPTION OF THE DRAWINGS

FIG. 1 is a diagrammatic illustration of a mobile machine shown as an off-road mining truck;

FIG. 2 is a block diagram illustrating an aspect of the present invention at a work site;

FIG. 3 is a diagrammatic illustration of an application of the present invention;

FIG. 4 is a side view of an application of the present invention;

FIG. 5 is a diagrammatic illustration of another aspect of an application of the present invention; and FIG. 6 is a flow diagram illustrating an embodiment of the present invention.

BEST MODE FOR CARRYING OUT THE INVENTION

The present invention is, in the preferred embodiment, a method for responding to the detection of an obstacle in the path of a mobile machine at a work site and, as an example, is described below with reference to a fleet of mobile machines at an earthworking site, such as an open pit mining site. However, other work sites, e.g., a warehouse, a logging site, a construction site, and the like, may benefit from application of the present invention.

Referring to the drawings and, in particular, to FIG. 1, a mobile machine 102 is shown. The mobile machine 102 of FIG. 1 is depicted as an off-road mining truck, which travels on a path 104 at a mining site. Fleets of off-road mining trucks are used extensively at open pit mining sites to haul materials throughout the site. Recent developments in technology allow fleets of mining trucks to operate autonomously, thus freeing human operators from working long shifts in harsh environments.

A major concern in operating mobile machines autonomously is the ability to detect obstacles in the path of the mobile machine 102 accurately, in a harsh and constantly changing environment. Examples of obstacles include rocks and boulders, and other mobile machines that traverse the same path.

Although the mobile machine 102 in FIG. 1 is shown as an off-road mining truck, other types of mobile machines may use the present invention. Examples of mobile machines include fork lift trucks, logging trucks, wheel loaders, track-type tractors, and the like.

Referring now to FIG. 2, a block diagram of operations at a work site 204 as depicted in a preferred embodiment of the present invention is shown. The mobile machine 102 traverses the work site 204 and communicates with a fleet manager 202 through a communications link 210. The communications link 210 provides two way communications between the mobile machine 102 and the fleet manager 202. The communications link 210 may be any type of wireless communications system, such as RF radio, satellite, telephony, and the like. Communications links are well known in the art and will not be discussed further.

The work site 204 is also traversed by one or more additional mobile machines, known in a preferred embodiment of the present invention as a predictable moving obstacle 206. The predictable moving obstacle 206 also communicates with the fleet manager 202 through the communications link 210. The mobile machine 102 and the predictable moving obstacle 206 are each configured to communicate location, heading, and velocity information to the fleet manager 202.

The mobile machine 102 and the predictable moving obstacle 206 may be configured to communicate directly with each other through an alternative communications link 212, either alternatively or in addition to the communications link 210 to the fleet manager 202.

At the work site 204, an additional type of mobile machine, known in a preferred embodiment of the present invention as a non-predictable moving obstacle 208, may be found. The non-predictable moving obstacle 208 does not have a communications link with the fleet manager 202, and therefore is not able to communicate location, heading, and velocity information to the fleet manager 202. Examples of non-predictable moving obstacles 208 in a preferred embodiment of the example of a mining site include water trucks used to water the roads to reduce the amount of dust being generated, and trucks being driven by supervisors and service people.

With reference to FIGS. 3–5, diagrammatic illustrations of a mobile machine 102 on a path 104 and operating in a preferred embodiment of the present invention is shown.

In FIG. 3, the mobile machine 102 is shown traversing a path 104. The mobile machine 102 scans for obstacles using an obstacle scanning sensor system (not shown). The mobile machine 102 in FIG. 3 is shown scanning in a far range scan pattern 302 and a near range scan pattern 304. However, any variety and combination of scan patterns may be generated by the mobile machine 102 without deviating from the spirit of the invention.

The scan pattern in FIG. 3 is divided into three zones. A first zone 306 extends from the mobile machine 102 to a first distance from the mobile machine 102. A second zone 308 extends from the first distance to a second distance from the mobile machine 102. A third zone extends from the second distance to a third distance from the mobile machine 102. The use of the three zones 306,308,310 are discussed in more detail below.

The preferred embodiment of the present invention is discussed with reference to the use of three zones 306,308, 310. However, the spirit of the present invention allows for any number of zones to be used. For example, the present invention may be configured to use two zones, four zones, or any number of zones that may be deemed necessary.

FIG. 4 illustrates a side view of the preferred embodiment shown in FIG. 3. The three zones 306,308,310 divide the far and near range scan patterns 302,304 into three sections. Preferably, the third zone 310 extends from the second zone to the far end of the scan pattern 302. Thus, the entire area covered by the scan patterns 302,304 is included in at least one zone 306,308,310.

In FIG. 5, the mobile machine 102 is shown moving around a stationary obstacle 502, e.g., a rock or boulder. As the mobile machine 102 alters course to move around the obstacle 502, the far and near range scan patterns 302,304 must shift to allow the mobile machine 102 to continue to scan for obstacles. In a preferred embodiment of the present invention, the zones 306,308,310 must also shift to maintain position relative to the mobile machine 102.

Referring now to FIG. 6, a flow diagram illustrating detailed operation of a preferred embodiment of the present invention is shown.

In a first control block 602, the mobile machine 102 scans for obstacles in a field of interest in the path 104 being traversed by the mobile machine 102. In a second control block 604, an obstacle is detected and the mobile machine 102 determines the location, heading, and velocity of the detected obstacle. If the obstacle is stationary, e.g., a rock, boulder, or other non-moving mobile machine, the determined heading and velocity will be zero. The location, heading, and velocity of a moving obstacle is determined using methods of obstacle detection systems that are known in the art.

In a third control block 606, at least one parameter is determined by the mobile machine 102. Parameters are determined as a function of at least one of the mobile machine, the detected obstacle, and the work site. The parameters that are determined affect the ability of the mobile machine 102 to avoid the detected obstacle. For example, parameters determined as a function of the mobile machine 102 include the velocity of the mobile machine 102, the weight of the load being carried by the mobile machine 102, and other factors that affect the minimum stopping distance of the mobile machine 102.

Examples of parameters that are determined as a function of the detected obstacle include the velocity and heading of the obstacle with respect to the velocity and heading of the mobile machine 102. Additional examples of parameters that are determined as a function of the detected obstacle include the minimum stopping distance of the moving obstacle as determined by the mobile machine 102. If the obstacle is a predictable moving obstacle 206, the minimum stopping distance of the obstacle may be determined from the data provided by the fleet manager 202 in the some manner that the mobile machine 102 would determine the minimum stopping distance of the mobile machine 102. If the obstacle is a non-predictable moving obstacle 208, the mobile machine can determine the minimum stopping distance of the obstacle as a function of other parameters, such as the velocity of the obstacle and parameters that are determined as a function of the work site 204.

Parameters that are determined as a function of the work site 204 may include characteristics of the work site 204 that can affect the minimum stopping distance of the mobile machine 102. Examples of such parameters are the condition of the surface of the path 104, e.g., amount of moisture on the path 104, type of material (dirt, sand, rock, etc.), and the like. In addition, the slope of the grade of the path 104 may be a parameter. For example, the mobile machine 102 may stop in a shorter distance going up a hill than going down a hill.

Parameters that are determined as a function of the work site 204 may also include characteristics of the work site 204 that can affect the maximum distance that an obstacle detection system can scan. For example, dust, fog, and night operations may affect the range that an obstacle detection system can function in.

The examples of parameters discussed above are representative of a sampling of parameters that may be of interest in the preferred embodiment of the present invention. It is emphasized that other parameters may be determined in the present invention, and any combination of parameters may be used.

In a first decision block 608, a level of predictability of motion of the detected obstacle relative to the motion of the mobile machine 102 is determined. In the preferred embodiment, one of two levels of predictability is chosen. The obstacle is determined to be a predictable moving obstacle 206 or a non-predictable moving obstacle 208.

The obstacle is determined to be a predictable moving obstacle 206 if the planned heading and velocity of the obstacle is communicated to the mobile machine 102 from either the fleet manager 202 or directly from the obstacle. The movement of the obstacle is predictable if the mobile machine 102 knows the heading of the obstacle, knows the velocity of the obstacle, and knows of any planned changes in either the heading or the velocity of the obstacle.

The obstacle is determined to be a non-predictable moving obstacle 208 if the planned heading and velocity of the obstacle is not communicated to the mobile machine 102 from either the fleet manager 202 or directly from the obstacle. The movement of the obstacle is non-predictable if the mobile machine 102 knows the heading of the obstacle, knows the velocity of the obstacle, but does not know of any planned changes in either the heading or the velocity of the obstacle.

With continued reference to FIG. 6, control proceeds to a fourth control block 610 if the motion of the obstacle is determined to be predictable, or to a fifth control block 612 if the motion of the obstacle is determined to be non-predictable. In the fourth and fifth control blocks 610,612, the range of each zone 306,308,310 is defined. Preferably, if the motion of the obstacle is non-predictable, the range of each zone 306,308,310 is larger than the ranges for a predictable moving obstacle 206. The larger ranges allow for longer response times by the mobile machine 102 due to the non-predictable heading and velocity of the obstacle. The range of each zone 306,308,310 is also varied as a function of the determined parameters to allow for variations in obstacle sensing range and stopping distance by the mobile machine 102.

In the preferred embodiment, three zones are used. The first zone 306 from the mobile machine 102 to the first distance from the mobile machine 102 is known as an alarm zone 306. The second zone 308 from the first distance to a second distance from the mobile machine 102 is known as an alert zone 308. The third zone 310 from the second distance to a third distance from the mobile machine 102 is known as a caution zone 310. Detection of a moving obstacle in any of the three zones 306,308,310 causes a unique responsive action by the mobile machine 102, as is discussed below.

If the moving obstacle is determined to be in the caution zone 310 in a second decision block 614, control proceeds to a sixth control block 616. In the sixth control block 616, the mobile machine 102 maintains the velocity that the mobile machine 102 previously had. However, the mobile machine 102 monitors the moving obstacle in preparation for the moving obstacle entering one of the other two zones 306,308 from the caution zone 310.

If the moving obstacle is determined, in the second decision block 614, to not be in the caution zone 310, control proceeds to a third decision block 613. If, in the third decision block 618, the moving obstacle is determined to be in the alert zone 308, control moves to a seventh control block 620, where the mobile machine 102 reduces velocity.

The desired amount of reduction of velocity of the mobile machine 102 is determined, preferably, by analyzing the heading and velocity of the moving obstacle with respect to the heading and velocity of the mobile machine 102, and reducing the velocity of the mobile machine 102 enough to enable the mobile machine 102 and the moving obstacle to continue moving along their present headings without interfering with the travel paths of each other.

Alternatively, the present invention may allow the mobile machine 102 to alter its heading to prevent interference with the motion of the moving obstacle. For example, if the moving obstacle is determined to be moving directly toward the mobile machine 102 on the path 104, the mobile machine 102 may slightly and temporarily alter course to allow the moving obstacle and the mobile machine 102 to pass each other.

If the moving obstacle is determined, in the third decision block 618, to not be in the alert zone 308, control proceeds to a fourth decision block 622. If, in the fourth decision block 622, the moving obstacle is determined to be in the alarm zone 306, control moves to an eighth control block 624, where the mobile machine 102 stops until the moving obstacle is no longer in the alarm zone 306. If the moving obstacle is determined to not be in the alarm zone 306 in the fourth decision block 622, then the moving obstacle is no longer in the field of interest, and control returns to the first control block 602.

If, in the first decision block 608, it is determined that the moving obstacle is a predictable moving obstacle 206, the mobile machine 102 has knowledge of the planned heading and velocity of the predictable moving obstacle 206. The mobile machine 102 is also informed by either the fleet manager 202 or the predictable moving obstacle 206 if the heading or velocity of the obstacle changes. With this information, the mobile machine 102 is able to predict the movement of the detected obstacle into any one of the three zones 306,308,310. Therefore, the mobile machine 102 can initiate a responsive action corresponding to any of the zones 306,308,310 that the predictable moving obstacle 206 is about to move into. This predictive ability of the mobile machine 102 allows for a more efficient method for responding to the presence of a moving obstacle in the scanned field of interest of the mobile machine 102.

INDUSTRIAL APPLICABILITY

In an example of an application of the present invention, a fleet of off-road mining trucks travel over roads throughout a mining site, hauling loads of material and performing other tasks. The mining site is typically in a harsh environment and the roads at the mining site are constantly changing due to the changing nature of the mining areas.

Quite often, conditions arise which introduce obstacles on the mining roads. For example, rocks and boulders may roll or slide down hillsides onto the roads, materials may spill out of the trucks, and trucks may break down and block the roads. In addition, with multiple trucks traveling on the same roads, the trucks frequently become moving obstacles to each other.

Operators of these trucks constantly monitor the roads for obstacles and respond as needed by either stopping, slowing down, or driving around the obstacle. However, autonomous trucks are being developed to remove human operators from these harsh, fatiguing environments. Consequently, some means is required to monitor the roads for obstacles and respond appropriately in an autonomous manner. The preferred embodiment of the present invention allows for an autonomous fleet of mining trucks to monitor for moving obstacles by employing any of a variety of obstacle detection techniques, determine the presence of a moving obstacle, and respond to the presence of the moving obstacle in an appropriate and efficient manner.

Other aspects, objects, and features of the present invention can be obtained from a study of the drawings, the disclosure, and the appended claims.

What is claimed is:

1. A method for responding to the detection of an obstacle in the path of a mobile machine, the mobile machine traversing the path at a work site, including the steps of:

scanning a field of interest in the path;

detecting the presence of an obstacle in the path;

determining at least one parameter as a function of at least one of the mobile machine, the detected obstacle, and the work site;

determining a level of predictability of motion of the detected obstacle relative to motion of the mobile machine, the level of predictability being a function of a planned heading and velocity of the detected obstacle;

setting a range of each of a plurality of zones on a segment of the path being traversed by the mobile machine, the range of each zone being set in response to the level of predictability and the at least one parameter; and initiating a responsive action by the mobile machine as a function of the zone that the obstacle is located in.

2. A method, as set forth in claim 1, wherein detecting the presence of an obstacle includes the step of determining a condition of the obstacle as being one of stationary and in motion.

3. A method, as set forth in claim 2, wherein determining a condition of the obstacle as being in motion includes the step of determining a location, heading, and velocity of the obstacle relative to the mobile machine.

4. A method, as set forth in claim 1, wherein determining at least one parameter includes determining at least one parameter of the mobile machine as a function of a minimum stopping distance of the mobile machine.

5. A method, as set forth in claim 4, wherein a parameter is a velocity of the mobile machine.

6. A method, as set forth in claim 4, wherein a parameter is a total weight of the mobile machine.

7. A method, as set forth in claim 1, wherein determining at least one parameter includes determining at least one parameter of the work site as a function of the minimum stopping distance of the mobile machine.

8. A method, as set forth in claim 7, wherein a parameter is a condition of a surface of the path being traversed by the mobile machine.

9. A method, as set forth in claim 7, wherein a parameter is a slope of a grade of the path being traversed by the mobile machine.

10. A method, as set forth in claim 1, wherein a parameter is a condition of the work site, the condition determining a maximum distance wherein an obstacle can be detected.

11. A method, as set forth in claim 1, wherein determining at least one parameter includes determining at least one parameter as a function of the detected obstacle with reference to the mobile machine.

12. A method, as set forth in claim 11, wherein a parameter is a velocity of the detected obstacle relative to a velocity of the mobile machine.

13. A method, as set forth in claim 11, wherein a parameter is a heading of the detected obstacle relative to a heading of the mobile machine.

14. A method, as set forth in claim 11, wherein a parameter is a minimum stopping distance of the detected obstacle.

15. A method, as set forth in claim 1, wherein determining a level of predictability of motion of the detected obstacle includes determining a planned heading and velocity of the detected obstacle in response to the detected obstacle communicating the planned heading and velocity to a fleet manager, the fleet manager being in communication with the detected obstacle and the mobile machine.

16. A method, as set forth in claim 15, wherein a high level of predictability is determined in response to the planned heading and velocity of the detected obstacle being communicated by the fleet manager to the mobile machine.

17. A method, as set forth in claim 15, wherein a low level of predictability is determined in response to the fleet manager being unable to communicate the planned heading and velocity of the detected obstacle to the mobile machine.

18. A method, as set forth in claim 1, wherein setting a range of each of a plurality of zones includes the step of setting a range for each of three zones in the field of interest, including a first zone from the mobile machine to a first distance from the mobile machine, a second zone from the first distance to a second distance from the mobile machine, and a third zone from the second distance to a third distance from the mobile machine.

19. A method, as set forth in claim 18, wherein initiating a responsive action includes the steps of:

stopping the mobile machine in response to the detected obstacle being in the first zone;

reducing a velocity of the mobile machine in response to the detected obstacle being in the second zone; and maintaining a desired velocity of the mobile machine in response to the detected obstacle being in the third zone.

20. A method, as set forth in claim 19, wherein initiating a responsive action includes the step of altering a heading of the mobile machine in response to the detected obstacle being in one of the first, second, and third zones.

21. A method, as set forth in claim 20, further including the steps of:

predicting a movement of the detected obstacle into one of the first, second, and third zones; and initiating a corresponding responsive action by the mobile machine.

* * * * *